United States Patent
Horiuchi et al.

(10) Patent No.: US 8,923,206 B2
(45) Date of Patent: Dec. 30, 2014

(54) WIRELESS COMMUNICATION APPARATUS AND WIRELESS COMMUNICATION METHOD

(75) Inventors: Ayako Horiuchi, Kanagawa (JP); Seigo Nakao, Kanagawa (JP); Akihiko Nishio, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 134 days.

(21) Appl. No.: 13/643,330

(22) PCT Filed: Apr. 15, 2011

(86) PCT No.: PCT/JP2011/002239
§ 371 (c)(1),
(2), (4) Date: Oct. 25, 2012

(87) PCT Pub. No.: WO2011/135795
PCT Pub. Date: Nov. 3, 2011

(65) Prior Publication Data
US 2013/0039164 A1 Feb. 14, 2013

(30) Foreign Application Priority Data
Apr. 30, 2010 (JP) .................... 2010-105840

(51) Int. Cl.
| H04W 4/00 | (2009.01) |
| H04L 1/18 | (2006.01) |
| H04L 5/00 | (2006.01) |
| H04J 13/00 | (2011.01) |
| H04J 13/18 | (2011.01) |
| H04B 7/155 | (2006.01) |
| H04L 1/00 | (2006.01) |

(52) U.S. Cl.
CPC ............ *H04L 1/1858* (2013.01); *H04L 1/1896* (2013.01); *H04L 5/0055* (2013.01); *H04B 7/15507* (2013.01); *H04J 13/004* (2013.01); *H04J 13/18* (2013.01); *H04L 1/1861* (2013.01); *H04L 2001/0097* (2013.01)
USPC ........................................... 370/328

(58) Field of Classification Search
None
See application file for complete search history.

(56) References Cited

U.S. PATENT DOCUMENTS 7,852,959 B2 * 12/2010 Kwak et al. .................... 375/260
2007/0258540 A1 * 11/2007 Ratasuk et al. ............... 375/267

(Continued)

FOREIGN PATENT DOCUMENTS

| JP | 2008-136156 A | 6/2008 |
| WO | 2009/022464 A1 | 2/2009 |

(Continued)

OTHER PUBLICATIONS

Author Unknown, UL Backhaul Timing alignment, Document R1-094661, Nov. 13, 2009, pp. 1-3.*

(Continued)

*Primary Examiner* — Christopher Crutchfield
(74) *Attorney, Agent, or Firm* — Pearne & Gordon LLP

(57) ABSTRACT

A wireless communication apparatus of the invention has a determination section that determines which one of a plurality of formats is used for determining transmission symbols to be transmitted to another communication apparatus; a control section that determines a type a sequence length of an orthogonal code and used for assigning ACK/NACK symbols to identical symbols in an identical slot on basis of the format determined by the determination section, without depending on a number of transmission symbols capable of being transmitted to the other communication apparatus; a spreading section that spreads the ACK/NACK symbols by an identical type of orthogonal code in the plurality of formats set based on the type and the sequence length of the orthogonal code determined by the control section; and a transmission section that transmits the spread ACK/NACK symbols using the determined format.

7 Claims, 21 Drawing Sheets

(56) References Cited

U.S. PATENT DOCUMENTS

| | | |
|---|---|---|
| 2008/0075060 A1* | 3/2008 | Tiirola et al. .............. 370/344 |
| 2009/0046646 A1 | 2/2009 | Cho et al. |
| 2009/0092148 A1 | 4/2009 | Zhang et al. |
| 2010/0046480 A1 | 2/2010 | Kawamura et al. |
| 2011/0286543 A1 | 11/2011 | Nakao et al. |
| 2011/0305226 A1 | 12/2011 | Zhang et al. |

FOREIGN PATENT DOCUMENTS

| | | |
|---|---|---|
| WO | 2009/022833 A2 | 2/2009 |
| WO | 2009/038392 A2 | 3/2009 |

OTHER PUBLICATIONS

TSG-RAN WG1 #60, R1-100972, "Discussion on Backhaul Uplink Control Chanel with UL Timing," ZTE, San Francisco, USA, Feb. 22-26, 2010.

International Search Report for PCT/JP2011/002239 dated May 17, 2011.

* cited by examiner

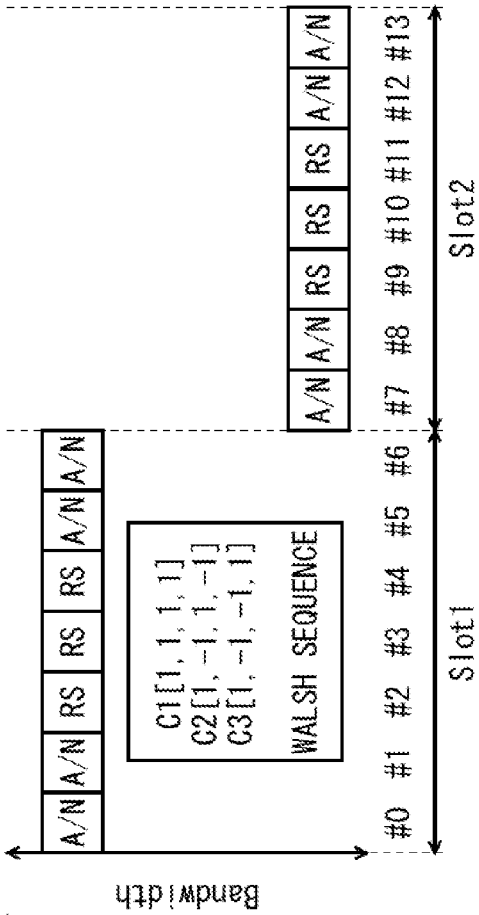
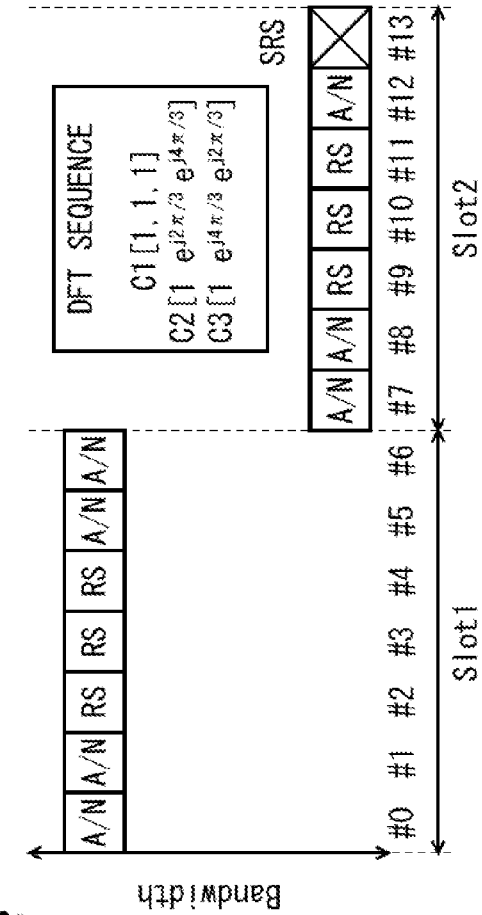
FIG. 17A
FIG. 17B

WIRELESS COMMUNICATION APPARATUS AND WIRELESS COMMUNICATION METHOD

TECHNICAL FIELD

The present invention relates to a wireless communication apparatus and a wireless communication method.

BACKGROUND ART

In recent years, transmitting not only voice data but also bulk data, like static image data and moving image data is on its way to becoming common in a cellular mobile communication system as information is increasingly transformed into multimedia. In order to bring bulk data transmission into practice, techniques for achieving a high transmission rate by utilization of a high frequency radio band have been studied actively.

However, when the high frequency radio band is utilized, a high transmission rate can be expected at a short range, whereas attenuation caused by a transmission distance becomes greater as the distance increases. Therefore, when a mobile communication system utilizing a high frequency radio band is actually put into practice, an area covered by a wireless communication base station equipment (hereinafter abbreviated as a "base station") becomes smaller. This creates need to install a larger number of base stations. Since installing the base station entails a fair cost, there exists a strong demand for a technique of implementing a communication service utilizing a high frequency radio band while preventing an increase in the number of base stations.

To meet such a demand, as represented by a wireless relay system depicted in FIG. 11, there has been examined a relayed transmission technique for installing a wireless communication relay node device 20 (hereinafter referred to as a "relay node") between a base station 10 and a wireless communication mobile station device 30 (hereinafter referred to as a "mobile station") and effecting communication between the base station 10 and the mobile station 30 by way of the relay node 20 in order to enhance the area covered by the base station. Use of the relay technique makes it possible even for the mobile station 30 incapable of establishing direct communication with the base station 10 to carry out communication by way of the relay node 20. Incidentally, a mobile station 31 is a mobile station that is connected directly to the base station 10.

[Explanation of a TD Relay]

By reference to FIGS. 12 and 13, a TD relay is now described. FIG. 12 shows a conceptual rendering for explaining an uplink TD relay, and FIG. 13 shows a conceptual rendering for explaining a downlink TD relay. The TD relay (also called a "half duplex relay" or a "Type 1 relay") separates transmission from the base station to the relay node and transmission from the relay node to the mobile station by means of time division.

In the uplink shown in FIG. 12, transmission from the mobile station 30 to the relay node 20 over an access link (Access link) is carried out by means of a subframe #2 (Subframe #2). Communication from the relay node 20 to the base station 10 over a backhaul link (Backhaul link) is carried out by means of a subframe #3 (Subframe #3). Transmission from the mobile station 30 to the relay node 20 is again carried out by means of a subframe #4. Likewise, in the downlink shown in FIG. 13, transmission from the relay node 20 to the mobile station 30 over the access link (Access link) is carried out by means of the subframe #2 (Subframe #2). Communication from the base station 10 to the relay node 20 over the backhaul link (Backhaul link) is carried out by means of the subframe #3 (Subframe #3). Communication from the relay node 20 to the mobile station 30 is again carried out by means of the subframe #4.

As mentioned above, backhaul communication and Relay communication via the access link are divided along the time domain, whereby a transmission time and a receiving time of the relay node can be divided. Therefore, the relay node can relay communication without being affected by runaround crosstalk between a transmission antenna and a receiving antenna.

[Explanations of a Guard Time]

In order to switch from transmission to reception or from reception to transmission, the relay node 20, however, must set guard periods for switching an RF (Radio Frequency) circuit. FIG. 14 is a drawing for explaining the guard periods. As shown in FIG. 14, the relay node 20 sets the guard periods in a subframe when switching from transmission to reception or from reception to transmission. The guard period is presumed to be set to about 20 [µs] depending on performance of the equipment. Since the TD relay requires the guard times as mentioned above, subframes that the relay node 20 cannot transmit or receive occur.

[Instance where the TD Relay is Applied to a Synchronization System]

There are proposals for letting timings of subframes coincide with each other by synchronizing the base station 10 and the relay node 20 by means of the GPS or the like. Timings of the frames are synchronized with each other by means of the GPS, or the like, and the base station 10 and the relay node 20 concurrently transmit DL signals and receive UL signals. Since the base station 10 and the relay node 20 concurrently perform transmission as a result of being synchronized as mentioned above, synchronization is appropriate for a case where the mobile station 30 receives signals from both the base station 10 and the relay node 20.

Moreover, if synchronization between the subframe of the base station 10 and the subframe of the relay node 20 is not achieved in a TDD system, signals in the downlink (DL) channel and the uplink (UL) channel will interfere with each other. For this reason, letting timings of the subframes coincide with each other has been examined. In the TDD system, the UL and the DL are separated from each other by a time, and the same frequency is occupied by the UL and the DL.

FIG. 15 shows an example of the TDD system. The TDD system determines timing of the subframe of the DL and timing of the subframe of the UL while taking timing of a subframe of the base station 10 as a reference. The timing of the subframe of the DL corresponds to transmission timing of the base station 10. The timing of the subframe of the UL corresponds to timing at which the base station 10 receives the UL signal. The mobile station 30 receives the DL signal including a delay equivalent to a time consumed by transmission from the base station 10 to the mobile station 30. In order to let the timing at which the base station 10 is to receive the UL signal coincide with receiving timing of the mobile station 30, the mobile station 30 transmits the UL signal earlier a time equivalent to the delay due to transmission from the base station 10 to the mobile station 30.

A subframe used for switching from the DL to the UL (i.e., Subframe 2 in FIG. 15) is called a "Special Subframe," and both the DL signal and the UL signal exist in this subframe. In the TDD system, when the subframe of the base station 10 and the subframe of the relay node 20 are not synchronized with each other, when the relay node 20 receives the UL signal from the mobile station 30 by means of the special subframe, there arises a problem of an increase in probability of the DL signal transmitted from the base station 10 to the mobile station 30 inducing interference.

[Explanations of ACK/NACK Signals Transmitted to PUCCH]

FIG. 16 shows an example signal of one slot. As shown in FIG. 16, a plurality of ACK/NACK signals transmitted from a plurality of terminals (the mobile stations 30) are spread along the time domain by means of a ZAC (Zero Autocorrelation) sequence exhibiting a zero autocorrelation characteristic, a Walsh sequence, and a DFT (Discrete Fourier Transform) sequence, and the thus-spread signals remain code-multiplexed within the PUCCH. Further, reference symbols (W0, W1, W2, W3) in FIG. 16 represent a Walsh sequence of sequence length 4, and reference symbols (F0, F1, F2) represent a DFT sequence of sequence length 3.

As shown in FIG. 16, in a terminal (the mobile station 30), an ACK or NACK answer signal is first transformed by means of a ZAC sequence (of sequence length 12) into a frequency component corresponding to 1SC-FDMA symbol along a frequency domain with use of primary spread. Subsequently, the answer signal subjected to primary spread and the ZAC sequence serving as a reference signal are subjected to secondary spread in correspondence with a Walsh sequence (of sequence length 4: W0 to W3) and a DFT sequence (of sequence length 3: F0 to F3). Moreover, the signals subjected to second spread are transformed into a signal of sequence length 12 on a time domain by means of IFFT (Inverse Fast Fourier Transform). CP is added to each of the signals subjected to IFFT, whereby one slot signal comprised of seven SC-FDMA symbols is produced.

Answer signals from different terminals (mobile stations 30) are spread by use of ZAC sequences corresponding to different quantities of cyclic shift (Cyclic shift indices) or orthogonal code sequences corresponding to different sequence numbers (Orthogonal cover indices: OC indices). The orthogonal code sequence corresponds to a set of Walsh sequence and DFT sequence. Moreover, the orthogonal code sequence is referred to also as a block-wise spreading code sequence (Block-wise spreading code). Accordingly, the base station 10 can separate a plurality of code-multiplexed answer signals apart from each other by use of existing despreading and correlation processing.

FIGS. 17A and 17B show a PUCCH arranged in a resource block (Resource Block: RB). FIG. 17A shows an example PUCCH (1) arranged in the RB, and FIG. 17B shows another example PUCCH (2) arranged in the RB. In FIGS. 17A, 17B, one subframe is comprised of two slots, and each of the slots is made up of the seven symbols shown in FIG. 16.

As shown in FIG. 17A, in order to acquire a frequency diversity gain between slots, a first slot and a second slot are transmitted to different RBs, respectively. Further, FIG. 17B shows a case where an SRS (Sounding Reference Signal) is arranged at a #13 symbol. In this case, an ACK/NACK symbol of Slot 2 becomes three symbols; hence, the DFT sequence is used also for the three symbols.

CITATION LIST

Non-Patent Literature

[NPL 1] TSG-RAN WG1 #60, R1-100972, "Discussion on Backhaul Uplink Control Channel with UL Timing," ZTE, San Francisco, USA, Feb. 22-Feb. 26, 2010

SUMMARY OF INVENTION

Technical Problem

In the uplink (UL) of the synchronization system, the number of symbols that the relay node 20 can transmit varies according to an amount of delay existing between the base station 10 and the relay node 20. By reference to FIGS. 18 and 19, explanations are now given to a variation in the number of symbols that the relay node 20 can transmit induced by the amount of delay. FIG. 18 shows example transmission and reception timings (1) in the uplink, and FIG. 19 shows example transmission and reception timings (2) in the uplink. Horizontal axes in FIGS. 18 and 19 represent time, respectively. Furthermore, the number of symbols employed in the UL is 14.

As shown in FIG. 18, when the amount of delay existing between the base station 10 and the relay node 20 is small, symbols #0 and #13 to be transmitted to the base station 10 cannot be transmitted (see Non-Patent Document 1).

In contrast, when the amount of delay existing between the base station 10 and the relay node 20 is large, the number of symbols that cannot be transmitted by means of a head to be transmitted to the base station 10 becomes larger. For example, as shown in FIG. 19, it become impossible to transmit head three symbols #0, #1, and #2.

Moreover, even in a synchronization system that is not perfect, the number of symbols that the relay node 20 can transmit to the base station 10 varies according to frame timing set for the mobile station 30 subordinate to the relay node 20. Further, in a system that is not perfectly synchronized, the number of symbols that the relay node 20 can transmit is often restricted by UL timing of a cell of the relay node 20 set by the relay node 20. Like this, when a head OFDM symbol of the UL cannot be transmitted, the PUCCH also requires a new format.

Accordingly, for instance, a conceivable measure is to use a different transmission format in the backhaul UL in accordance with the number of symbols that the relay node can transmit. FIG. 20 shows an example transmission format of the relay node 20. FIG. 20 shows which of symbols #0 to #13 in Slots 1 and 2 are assigned ACK/NACK (hereinafter described as "A/N") symbols in each of Cases A, B, C, and D that are transmission formats. Incidentally, the A/N symbols are presumed to be arranged in a resource block #K or a resource block #L differing from the resource block #K.

As shown in FIG. 20, a case where the symbols #1 to #12 (a range designated by an arrow shown in FIG. 20) can be transmitted is called Case A. A case where symbols #1 to #13 (a range designated by an arrow shown in FIG. 20) can be transmitted is called Case B. A case where symbols #2 to #13 (a range designated by an arrow shown in FIG. 20) can be transmitted is called Case C. A case where symbols #3 to #13 (a range designated by an arrow shown in FIG. 20) can be transmitted is called Case D. In addition, in each of the Cases, counting the number of symbols starts from symbol #0. The relay node 20 is assumed to determine which of the cases applies to itself by means of TA (Time advance) that is a signal for controlling transmission timing of a UL signal reported by the base station 10.

As shown in FIG. 20, a symbol that cannot be transmitted varies from Case to Case. For this reason, when an attempt is made to maximize the number of A/N symbols transmitted in each of the Cases, the relay node 20 cannot transmit the symbol #1 and the symbol #13 in Case A.

Accordingly, a conceivable measure is not to transmit the head symbol #0 of the Slot 1 and the final symbol #13 of the Slot 2. FIG. 21A shows an example modification of the PUCCH in Case A shown in FIG. 20. As shown in FIG. 21A, the A/N signal is arranged at the symbols #1, #5, and #6 of the Slot 1 and the symbols #7, #8, and #12 of the Slot 2. Since the Walsh sequence of sequence length 4 deteriorates orthogonality of the Slot 1 and that of the Slot 2 in this case, the Walsh sequence cannot be used. Accordingly, the OFT sequence of sequence length 3 is used for the Slot 1 and the Slot 2, respectively.

In Case C shown in FIG. 20, when an attempt is made to maximize the number of ACK/NACK symbols transmitted in each of the cases, the relay node cannot transmit the symbols #0 and #1. FIG. 21B shows an example modification of PUCCH in Case C shown in FIG. 20. As shown in FIG. 21B, two symbols (symbols #0 and #1) from the head of the Slot 1 are not transmitted. As a result of this, the A/N signal is arranged at symbols #5 and #6 of the Slot 1 and at symbols #7, #8, #12, and #13 of the Slot 2. Although the Walsh sequence of sequence length 4 can be used for the Slot 2, the Walsh sequence cannot be used for the Slot 1 because it deteriorates orthogonality of the Slot 1. For this reason, the Walsh sequence of sequence length 2 is used for the Slot 1.

However, if a transmission format is determined for each of relay nodes which differ from each other in terms of the number of symbols capable of being transmitted, there will arise a problem that multiplexing cannot be carried out between different Cases. For instance, an orthogonal code used for transmission of the A/N symbols in the Case A described by reference to FIG. 20 and FIG. 21A is different from that used in the Case C described by reference to FIG. 20 and FIG. 21B. Therefore, the symbols cannot be multiplexed, respectively.

An objective of the present invention is to provide a wireless communication apparatus and a wireless communication method that enable multiplexing of a PUCCH of another wireless communication apparatus capable of transmitting a different number of symbols.

Solution to Problem

According to one aspect of the present invention, there is provided a wireless communication apparatus comprising:

a determination section configured to determine which one of a plurality of formats is used for defining transmission symbols to be transmitted to another communication apparatus;

a control section configured to determine a type and a sequence length of an orthogonal code used for assigning ACK/NACK symbols to identical symbols in an identical slot on basis of the format determined by the determination section, without depending on a number of transmission symbols capable of being transmitted to the other communication apparatus;

a spreading section configured to spread the ACK/NACK symbols by an identical type of orthogonal code in the plurality of formats set on the basis of the type and the sequence length of the orthogonal code determined by the control section; and a transmission section configured to transmit the spread ACK/NACK symbols using the determined format.

In the above mentioned wireless communication apparatus, the control section may be configured to determine, as the identical type of orthogonal code, any one of a DFT sequence of the same sequence length, a Walsh sequence of the same sequence length, and a Walsh sequence of sequence length 2 which is partially orthogonal to a Walsh sequence of sequence length 4.

In the above mentioned wireless communication apparatus, the determination section may configured to determine to use a format having transmission symbols which are transmitted to the other communication apparatus at a first slot in a subframe comprising of the first slot and a second slot, when only a first symbol in an early-half of the first slot cannot be transmitted; and use a format having transmission symbols which are transmitted to the other communication apparatus at only the second slot in the subframe, when a first symbol in the early-half of the first slot and subsequent symbol cannot be transmitted.

In the above mentioned wireless communication apparatus, the determination section may be configured to determine to use a format having the Walsh sequence of sequence length 2 for a first symbol at a second slot in a subframe comprising of a first slot and the second slot and a subsequent symbol, when a final symbol in a last-half of the second slot cannot be transmitted.

In the above mentioned wireless communication apparatus, when the determination section is configured to determine to use the format having transmission symbols to be transmitted to the other communication apparatus at the second slot in the subframe in a case where the first symbol in the early-half of the first slot and subsequent symbol cannot be transmitted, the spreading section may be configured to spread the ACKMACK symbols in two resource blocks of the second slot by the identical type of orthogonal code.

In the above mentioned wireless communication apparatus, the determination section may be configured to determine to use a format having the Walsh sequence of sequence length 2 for a final symbol at a first slot in the subframe comprising of the first slot and a second slot and another symbol preceding the final symbol, when (i) a first symbol in an early-half of the first slot cannot be transmitted or (ii) the first symbol in the early-half first slot and another symbol next to the first symbol cannot be transmitted.

According to another aspect of the present invention; there is provided a wireless communication method comprising:

determining which one of a plurality of formats is used for defining transmission symbols to be transmitted to another communication apparatus;

determining a type and a sequence length of an orthogonal code used for assigning ACK/NACK symbols to identical symbols in an identical slot on basis of the determined format, without depending on a number of transmission symbols capable of being transmitted to the other communication apparatus;

spreading the ACK/NACK symbols by an identical type of orthogonal code in the plurality of formats set on the basis of the determined type and the determined sequence length of the orthogonal code; and transmitting the spread ACK/NACK symbols using the determined format.

Advantageous Effects of Invention

A wireless communication apparatus and a wireless communication method of the present invention enable multiplexing of a PUCCH of another wireless communication apparatus capable of transmitting a different number of symbols.

BRIEF DESCRIPTION OF DRAWINGS

FIG. 17A shows an example PUCCH (1) arranged in an RB, and FIG. 17B shows an example PUCCH (2) arranged in the RB.

DESCRIPTION OF EMBODIMENTS

Embodiments of the invention are hereunder described by reference to the drawings.

First Embodiment

Figure 1:
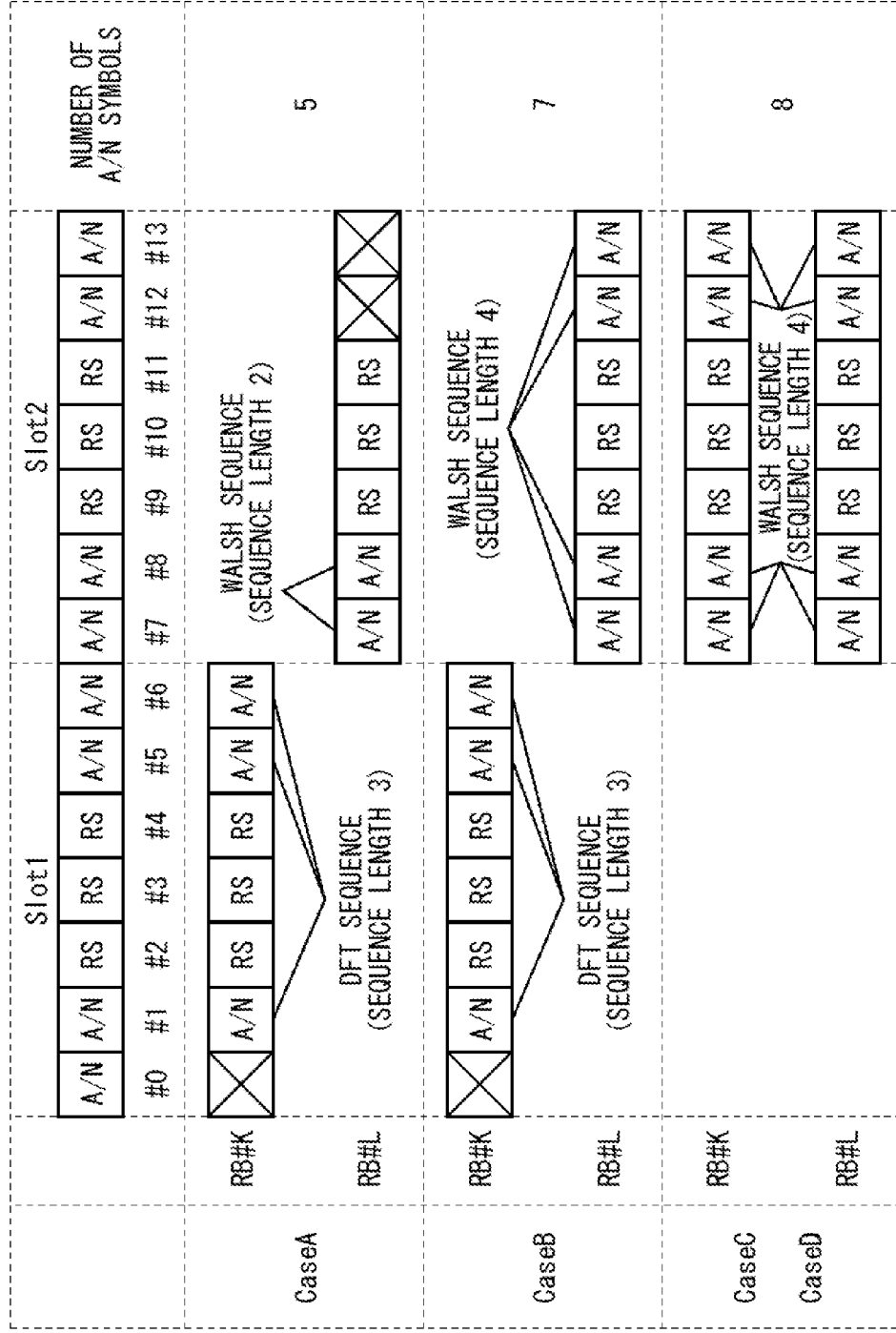
FIG. 1 is a drawing showing an example layout of symbols for transmitting ACK/NACK signals in a first embodiment.

In a first embodiment, in order to enable multiplexing all PUCCH signals of Cases A, B, C, and D shown in FIG. 20, symbols (A/N symbols) used for transmitting ACK/NACK signals (hereinafter described as "A/N") are determined as shown in FIG. 1. FIG. 1 is a drawing showing an example layout of symbols for transmitting ACK/NACK signals in the first embodiment.

Figure 20:
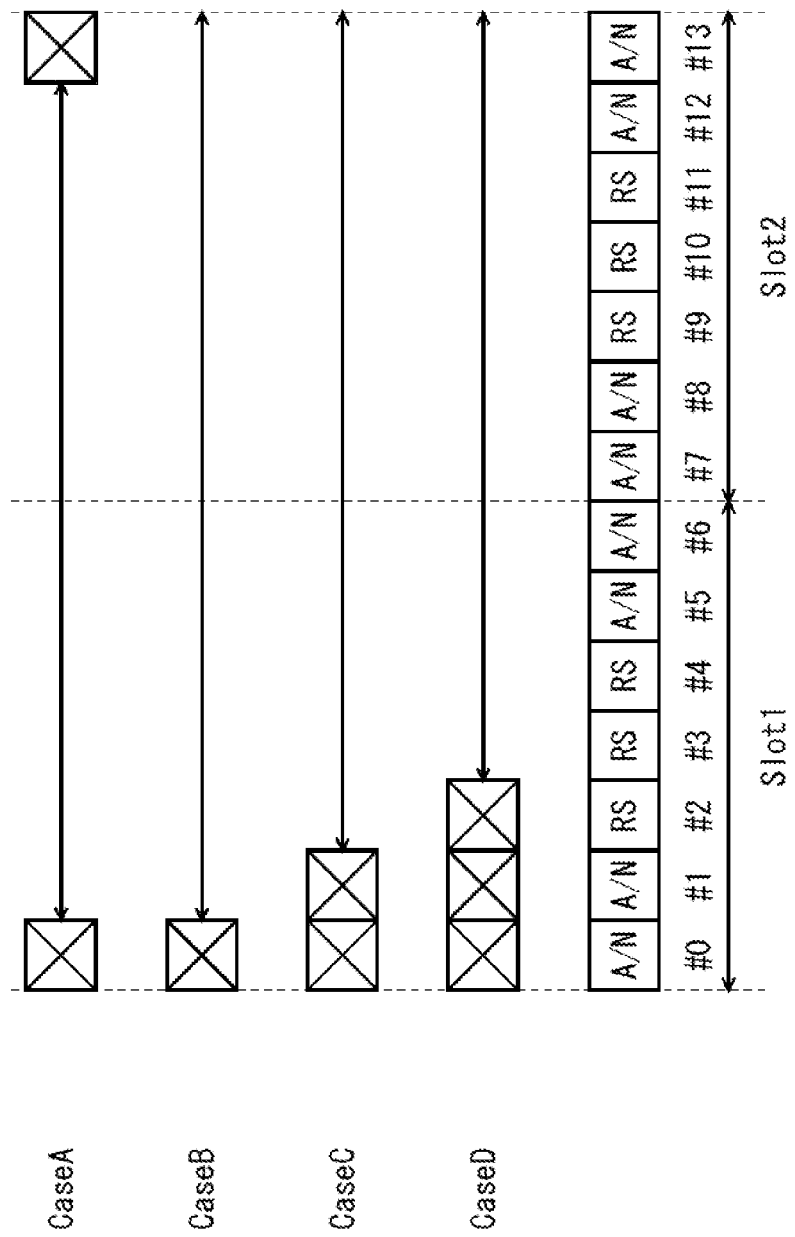
FIG. 20 is a drawing showing an example transmission format of a relay node 20.

FIG. 1 shows which of symbols #0 to #13 of Slots 1 and 2 in each of Cases A, B, C, and D shown in FIG. 20 are assigned A/N symbols. The A/N symbols are presumed to be arranged at a resource block #K or a resource block #L differing from the resource block #K. The number of A/N symbols required in each of the Cases A, B, C, and D shown in FIG. 20 is provided in (the right end of) FIG. 1.

Figure 2:
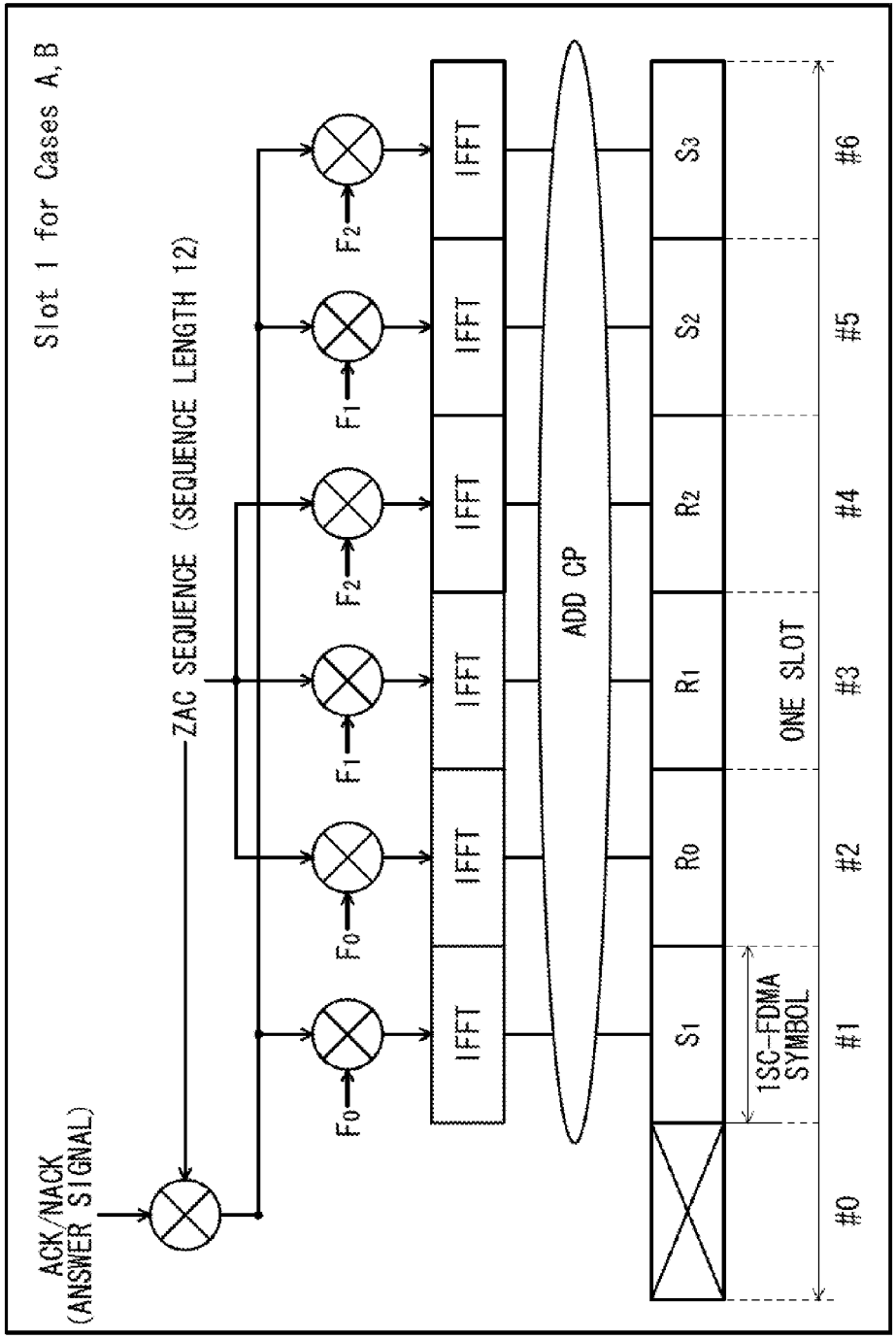
FIG. 2 is a drawing showing an example signal of Slot 1 in both Cases A and B.

As shown in FIG. 1, the A/N symbols are arranged in two slots (Slot 1 and Slot 2) in the cases A and B. In the Cases A and B, six symbols except the symbol #0 are used in the Slot 1. In the Slot 1, the A/N symbols are arranged at the symbols #1. #5, and #6, and reference signal (Reference Signal: RS) symbols are arranged at the symbols #2, #3, and #4. FIG. 2 shows an example signal of the Slot 1 in the Cases A and B. As shown in FIG. 2, the three symbols; namely, the A/N symbols 51, S2, and S3, are arranged in the Slot 1. Therefore, the DFT sequence (F0, F1, and F2) is used for multiplexing the A/N symbols in the Cases A and B.

Figure 3:
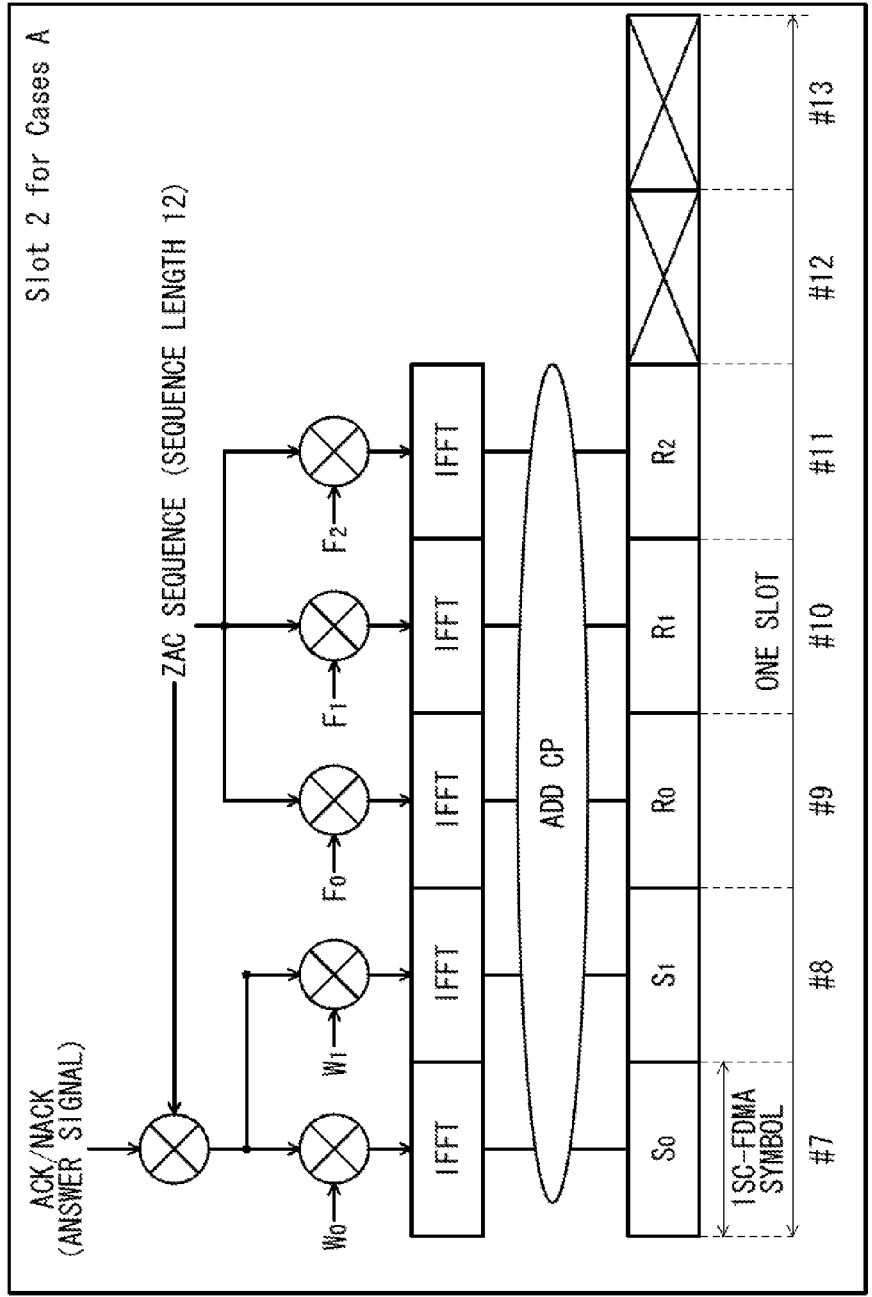
FIG. 3 is a drawing showing an example signal of Slot 2 in the Case A.

Since the symbol #13 of the Slot 2 cannot be transmitted in the Case A, a Walsh sequence of sequence length 4 cannot be used in the Slot 2. FIG. 3 shows an example signal of the Slot 2 in the Case A. As shown in FIG. 3, a Walsh sequence (W0, W1) of sequence length 2 is used for symbols #7 and #8 of the Slot 2 in the Case A. Therefore, a total number of the symbols employed for the A/N symbols in both the Slot 1 and the Slot 2 comes to five.

In the Case B, a Walsh sequence of sequence length 4 can be used for the Slot 2 (see FIG. 1). Therefore, a total number of the symbols employed for the A/N symbols in both the Slot 1 and the Slot 2 comes to seven. When compared with the Case A, the Case B employs two additional symbols.

Figure 21A:
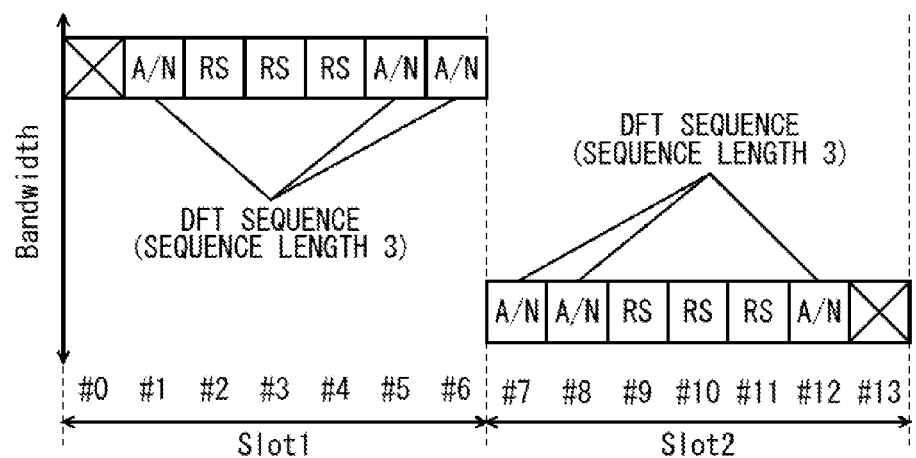
FIG. 21A is a drawing showing an example modification of Case A shown in FIG. 20.
Figure 21B:
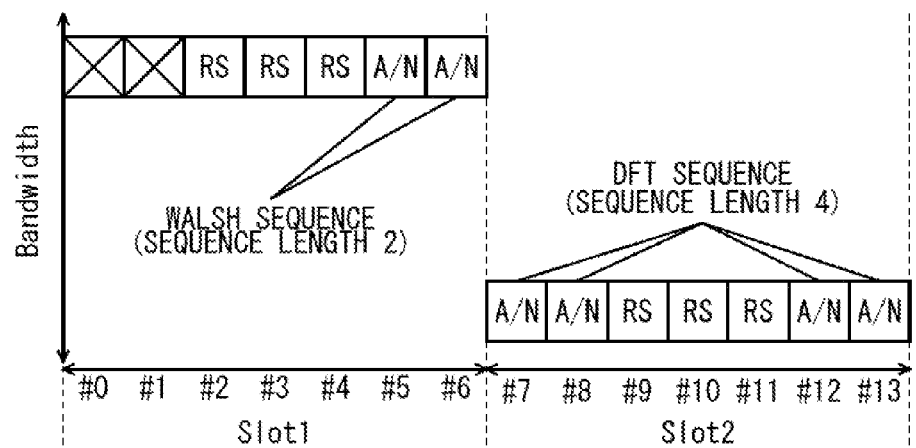
FIG. 21B is a drawing showing an example modification of Case C shown in FIG. 20.

As shown in FIG. 1, the A/N symbols are arranged in only the Slot 2 in the Cases C and D. In the Slot 2, the A/N symbols are assigned to the symbols #7, #8, #12, and #13, and RS symbols are assigned to the symbols #9, #10, and #11. For these reasons, the Walsh sequence (W0, W1 W2, and W3) is used for multiplexing the A/N symbols, whilst the DFT sequence is used for multiplexing the RS symbols. The layout of the Slot 2 in each of the Cases C and D is the same as the layout of the PUCCH of an LTE shown in FIG. 21B.

As shown in FIG. 1, in the Cases C and D, the PUCCH is transmitted not by the Slot 1 but by only the Slot 2. In order to transmit the PUCCH by means of two resource blocks (RB#K and RB#L), the A/N symbols are arranged in the Slot 2. Therefore, a total number of the symbols employed for the A/N symbols in both the Slot 1 and the Slot 2 comes to eight. The reason why the PUCCH is transmitted by means of the plurality of resource blocks is to acquire a diversity gain.

Incidentally, in the Cases C and D, if the PUCCH is transmitted not by the Slot 1 but by only the Slot 2, the diversity gain cannot be acquired, and reception quality of the PUCCH will become deteriorated. In the Cases C and D, since the PUCCH is transmitted by means of the plurality of RBs in the Slot 2, different circular shift sequences are used for the PUCCHs that are to be transmitted to each of the resource blocks, to thus reduce a PAPR (Peak-to-Average Power Ratio) representing a ratio of peak power of a transmission signal appearing at the time of transmission of a multicarrier wave to average power and CM (Cubic Metric). The reason for this is that use of the same circular shift sequence leads to an increase in CM.

When the transmission format of the PUCCH is set as described by reference to FIGS. 1 and 2, the PUCCH of the relay node 100 capable of transmitting a different number of symbols can be multiplexed. Moreover, an amount of delay becomes greater in sequence of the Cases D, C, B, and A in an environment where the relay node 100 is synchronized with the base station. Therefore, the amount of delay in the Case A is minimum, whereas the amount of delay in the Case D is maximum. Put another way, in the environment where the relay node 100 is synchronized with the base station, a distance of the relay node from the base station becomes greater in sequence of the Cases D, C, B, and A. Consequently, the distance of the relay node from the base station becomes minimum in the Case A and maximum in the Case D.

As a consequence, in the present embodiment, as the distance of the relay node 100 from the base station 200 becomes greater, the number of symbols used for A/N symbols can be increased. The relay node 100 located farther away from the base station 200 is expected to be subjected to poor average line quality. For this reason, in the embodiment, the quality of ACK/NACK signals of the base station 200 having poor line quality can be guaranteed further.

When the Case A is used, the sequence length of the Walsh sequence of the Slot 2 in the Case A is two. Therefore, codes employed between the Cases A can be multiplexed only twice by the code sequence. However, when the code of the Case A and any one of the codes of the Cases B, C, and D are multiplexed, a code [1, 1] (corresponding to the symbols #7 and #8) is assigned to the code of the Case A, and C2 [1, −1, 1, −1] or C3 [1, −1, 1] (corresponding to the symbols #7, #8, #12, and #13) is assigned to any one of the codes of the Cases B, C, and D. Since the code [1, 1] and the code C2 [1, −1, 1, −1] or C3 [1, −1, −1, 1] can maintain orthogonality, the codes can be multiplexed. Consequently, if one code is used in the Case A and if two codes are employed in any one of the Cases B, C, and D, three codes can be multiplexed.

Figure 4:
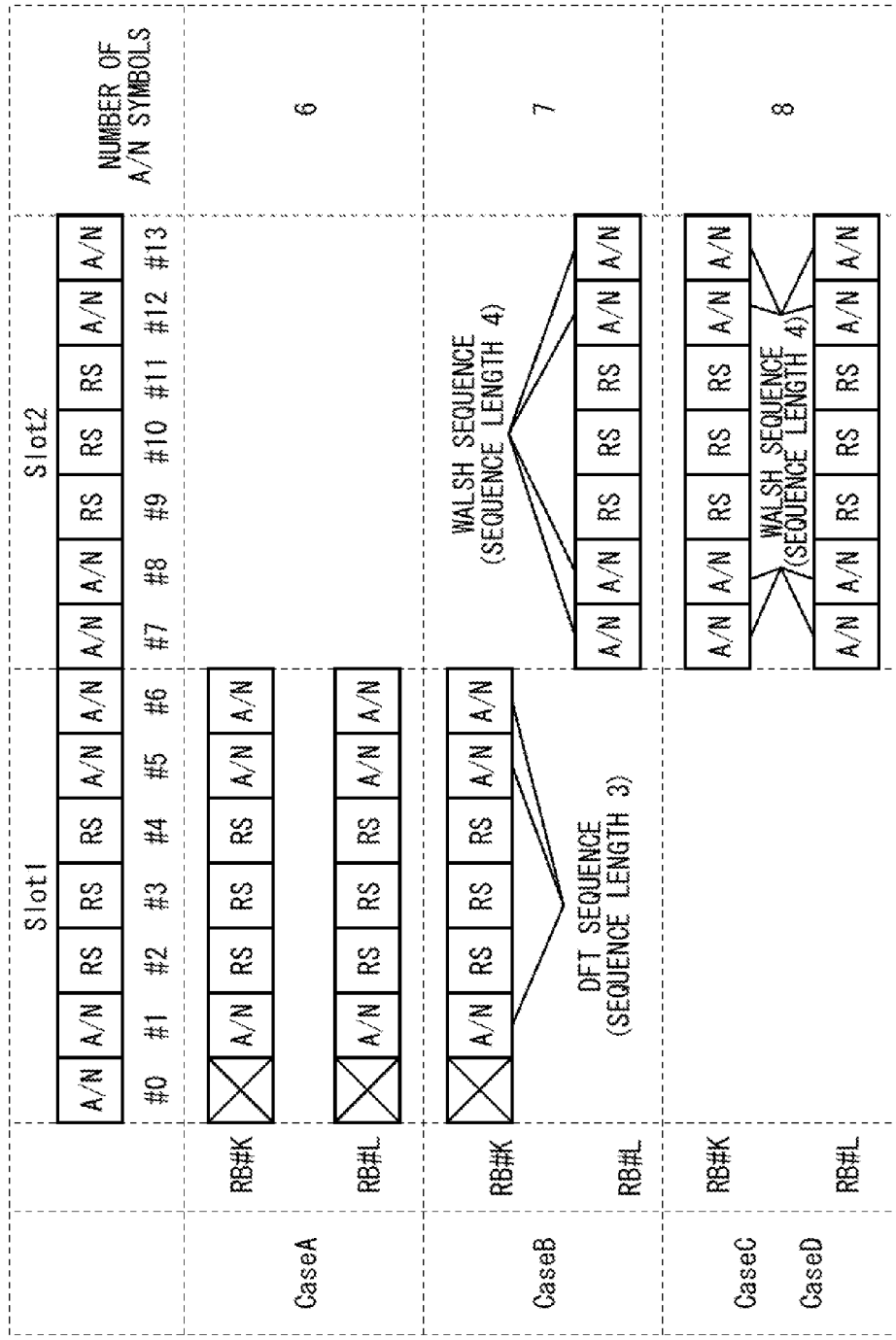
FIG. 4 is a drawing showing another example layout of A/N symbols used in the Case A.

By reference to FIG. 4, there is illustrated another example layout of the A/N symbols used for transmitting the ACK/NACK signal in the Case A. FIG. 4 is a drawing showing another example layout of the A/N symbols in the Case A. As shown in FIG. 4, in the Case A, the PUCCH can be transmitted by use of two resource blocks (RB#K and RB#L) in the Slot 1, and the PUCCH can be prevented from being transmitted in the Slot 2. Since this makes it possible to transmit six A/N symbols in the Case A, the number of symbols can be increased when compared with the case where both slots are used. Since the Cases B. C, and D except the Case A shown in FIG. 4 assume the same layout as that shown in FIG. 1, their detailed descriptions are omitted.

Figure 5:
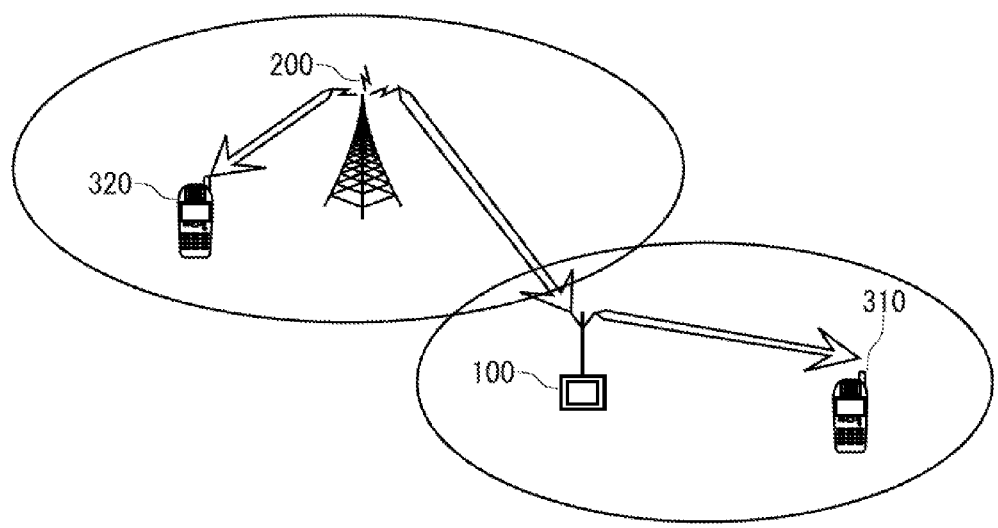
FIG. 5 is a drawing showing a wireless communication system of the first embodiment.

A wireless communication system of the embodiment is now described by reference to FIG. 5. FIG. 5 is a drawing showing the wireless communication system of the embodiment. As shown in FIG. 5, the relay node 100 receives a downlink (DL) signal from the base station 200, transmitting the received signal to the mobile station 310. Furthermore, the relay node 100 receives an uplink (UL) signal from the mobile station 310, transmitting the thus-received uplink signal to the base station 100. A mobile station 320 is a mobile station that is connected directly to the base station 200.

Figure 6:
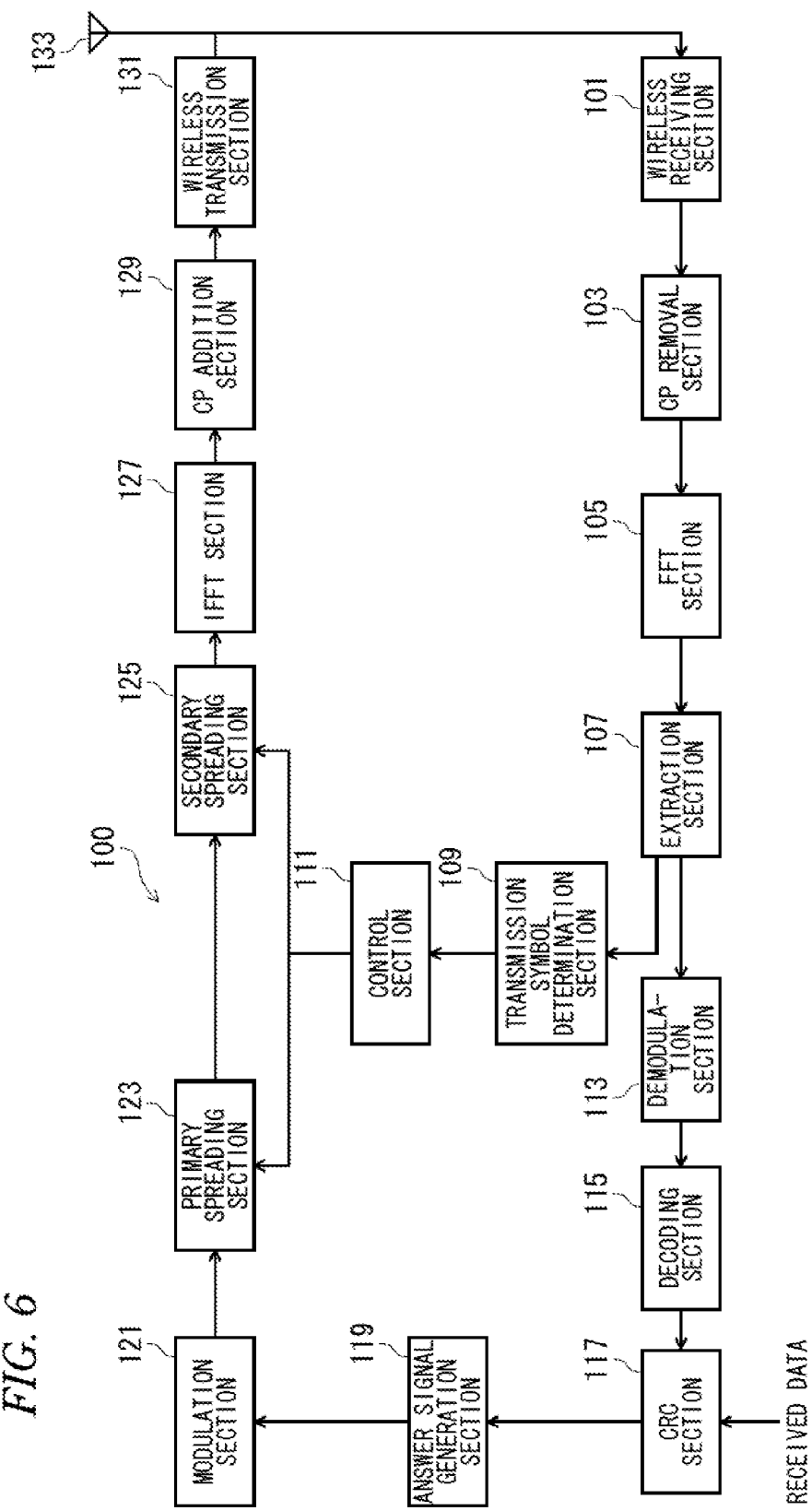
FIG. 6 is a block diagram showing a configuration of a relay node 100.

A configuration of the relay node 100 of the embodiment is described by reference to FIG. 6. FIG. 6 is a block diagram showing the configuration of the relay node 100. In the embodiment, attention is paid particularly to a configuration where the relay node 100 receives a DL signal from the base station 200 and transmits the PUCCH to the base station 200. A block diagram corresponding to the configuration is shown in FIG. 6.

The relay node 100 shown in FIG. 6 is equipped with a wireless receiving section 101, a CP removal section 103, an FFT section 105, an extraction section 107, a transmission symbol determination section 109, a control section 111, a demodulation section 113, a decoding section 115, a CRC section 117, an answer signal generation section 119, a modulation section 121, a primary spreading section 123, a secondary spreading section 125, an IFFT section 127, a CP addition section 129, and a wireless transmission section 131.

The wireless receiving section 101 receives an OFDM signal transmitted from the base station 200 by way of an antenna 133 and subjects the thus-received OFDM signal to reception processing, such as down conversion and A/D conversion.

The CP removal section 103 removes the CP added to the OFDM signal undergone reception processing.

The FFT section 105 subjects the received OFDM signal to FFT, thereby converting the signal into a frequency domain signal, and outputs the resultant received signal to the extraction section 107.

The extraction section 107 extracts timing control information from the received signal delivered from the FFT section 105, outputting the thus-extracted timing control information to the transmission symbol determination section 109. In relation to the timing information, a TA (Time Advance) signal used for controlling transmission timing of the UL or a signal used for determining a Case transmitted from the base station 200 may also be newly generated and reported. The word "Case" used herein designates any one of the Cases A, B, C, and D described by reference to FIG. 20.

From the timing control information received from the extraction section 107, the transmission symbol determination section 109 determines a format (the Cases A, B, C, and D shown in FIG. 1) of the transmission symbol of the UL signal transmitted from the relay node to the base station.

The control section 111 determines an orthogonal code sequence used as a secondary spreading code sequence of the Slot 1 and the Slot 2 from the format (the Cases A, B, C, or D) of the transmission symbol input from the transmission symbol determination section 109, and reports the thus-determined orthogonal code sequence to the secondary spreading section 125. For instance, when a plurality of formats, such as those shown in FIG. 1, are defined, the control section 111 determines a sequence length of the Walsh sequence for A/N symbols of the Slot 2 as two in the Case A and also determines the sequence length as four in the other Cases B, C, and D. Moreover, in the Case C and the Case D, the control section 111 notifies the secondary spreading section 125 to halt spreading such that nothing is transmitted in the Slot 1. Further, the control section 111 determines a circular shift sequence (e.g., the ZAC sequence and an amount of circular shift used for the ZAC sequence) and reports them to the primary spreading section 123. The circular shift sequence can also be set so as to be determined by a DL assignment signal directed to the relay node 100 itself, or the circular shift sequence can be assigned to each of relay nodes in advance. When the plurality of PUCCH signals are transmitted by means of a single resource, a circular shift sequence is determined for each of the PUCCH signals.

The demodulation section 113 demodulates downlink data received from the extraction section 107 and outputs the demodulated downlink data to the decoding section 115.

The decoding section 115 decodes the downlink data received from the demodulation section 113 and outputs the thus-decoded downlink data to the CRC section 117

The CRC section 117 generates decoded downlink data received from the demodulation section 113 and detects an error by use of CRC. In the case of CRC=OK (no error), the CRC section 117 outputs an ACK signal to the answer signal generation section 119. In the case of CRC=NG (an error found), the CRC section 117 outputs a NACK signal to the answer signal generation section 119. In the case of CRC=OK (no error), the CRC section 117 outputs the decoded downlink data as received data.

The answer signal generation section 119 generates an answer signal and a reference signal and outputs the those signals to the modulation section 121.

The modulation section 121 modulates the answer signal input from the answer signal generation section 119 and outputs the modulated answer signal to the primary spreading section 123.

The primary spreading section 123 subjects the answer signal and the reference signal to primary spreading on the basis of the circular shift sequence set by the control section 111 and outputs to the secondary spreading section 125 the answer signal and the reference signal that have undergone primary spreading. Specifically, the primary spreading section 123 subjects the answer signal and the reference signal to primary spreading in accordance with a command from the control section 111.

The secondary spreading section 125 subjects the answer signal and the reference signal to secondary spreading by use of the orthogonal code sequence set by the control section 111 and outputs the signals having undergone secondary spreading to the IFFT section 127. The secondary spreading section 125 does not output any signals to the IFFT section 127 in relation to a slot for which the secondary spreading section 125 is not commanded to perform spreading.

The IFFT section 127 transforms the frequency domain signal to a time domain signal, and the CP addition section 129 adds a signal, which is the same as that of a tail portion of the signal having undergone IFFT processing, as CP to a head of the signal.

The wireless transmission section 131 subjects an input signal to transmission processing, such as D/A conversion, amplification, and up conversion. The wireless transmission section 131 transmits a signal from the antenna 133 to the base station 200.

As above, in the embodiment, the longer the distance of the relay node 100 from the base station 200, the larger number of symbols for transmitting an ACK/NACK signal the relay node can transmit. The relay node 100 located farther away from the base station 200 is expected to be subjected to poor average line quality. For this reason, in the embodiment, the quality of ACK/NACK signals of the base station 200 having poor line quality can be guaranteed further.

In the embodiment, the ACK/NACK signal is not limited to an ACK signal or a NACK signal, and information, such as DTX, may also be transmitted.

Figure 7:
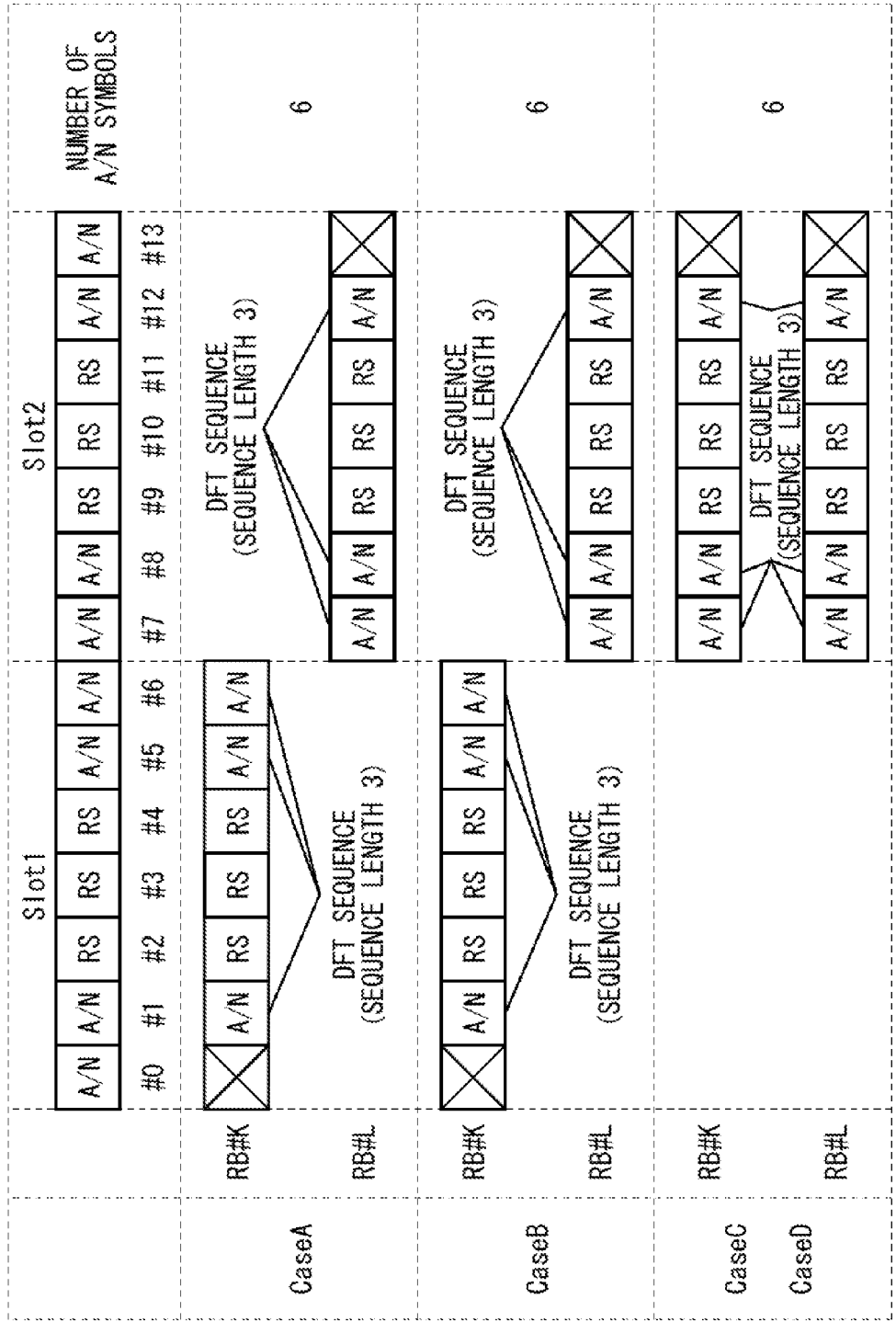
FIG. 7 is a drawing showing another example layout of the symbols for transmitting the ACK/NACK signals in the first embodiment.

In the embodiment, when the thirteenth symbol is used for SRS transmission, the A/N symbols of the Cases A, B, C, and D are arranged as shown in FIG. 7. FIG. 7 is a drawing showing another example layout of symbols for transmitting the ACK/NACK signals. The example layout differs from that shown in FIG. 1 in that the ACK/NACK signal of the second slot of the Cases A, B, C, and D is transmitted by means of the OFT sequence. Three A/N symbols are transmitted in the Slot 2 even in the Case A in the same manner as in the Cases B. C, and D.

Second Embodiment

Figure 8:
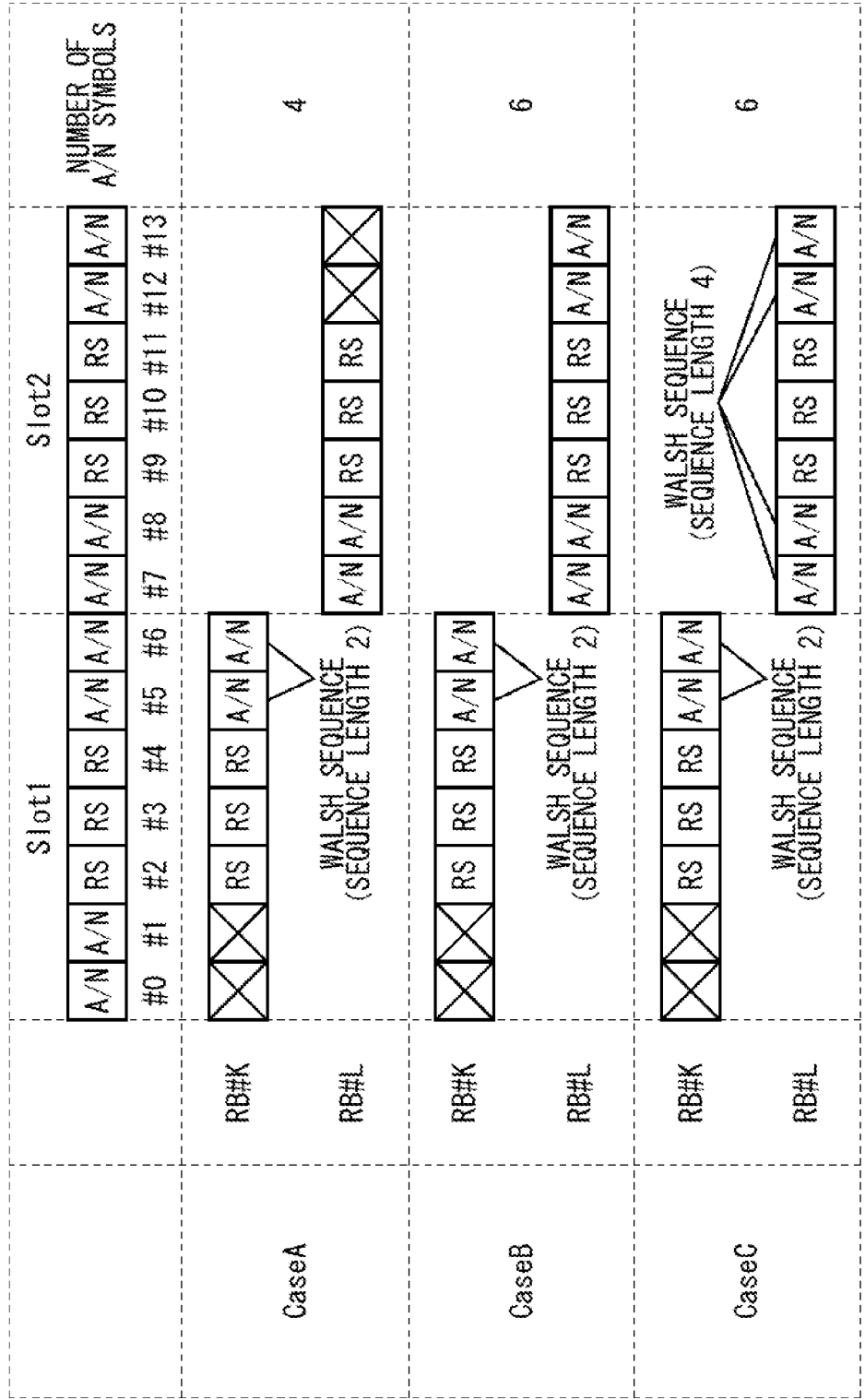
FIG. 8 is a drawing showing an example layout of symbols for transmitting ACK/NACK signals in a second embodiment.

In a second embodiment, in order to multiplex a PUCCH in the Cases A, B, and C shown in FIG. 20, symbols (A/N symbols) for transmitting an ACK/NACK signal (hereinafter described as an "A/N") are defined as shown in FIG. 8. FIG. 8 is a drawing showing an example layout of symbols used for transmitting an ACK/NACK signal in the second embodiment.

Like FIG. 1, FIG. 8 shows that the A/N symbols are assigned to which of the symbols #0 to #13 of the Slots 1 and 2 in each of the Cases A, B, and C shown in FIG. 20. The A/N symbols are presumed to be assigned to the resource blocks #K or resource blocks #L differing from the resource blocks #K. The number of A/N symbols required in each of the Cases A, B, C, and D shown in FIG. 20 is provided in (at a right end of) FIG. 8.

As shown in FIG. 8, in order to make it possible to transmit the PUCCH by the Slot 1 even in the Case C, five symbols except the symbols #0 and #1 are used as the A/N symbols. Specifically, in the Case C, the A/N symbols are assigned to the symbols #5 and #6 in the Slot 1, and the RS symbols are assigned to the symbols #2, #3, and #4. Since two A/N symbols are assigned to the Slot 1 in this case, the Walsh code of sequence length 2 is used for multiplexing the A/N symbols.

As shown in FIG. 8, in the Case C, the A/N symbols are assigned to the symbols #7, #8, #12, and #13, and the RS symbols are assigned to the symbols #9, #10, and #11 of the Slot 2 as in the case with the first embodiment. The Walsh sequence (W0, W1, W2, and W3) is used for multiplexing the A/N symbols, and the DFT sequence is used for multiplexing the RS. The layout is the same as that used for the PUCCH of the LTE shown in FIG. 20.

As shown in FIG. 8, in the Case A and the Case B, the Walsh sequence (W0, W1) of sequence length 2 is used for the symbols #7 and #8 in the Slot 1. In the Case A, a total number of the symbols employed for the A/N symbols in both the Slot 1 and the Slot 2 is four. In the Case B and the Case C, a total number of the symbols employed for the A/N symbols in both the Slot 1 and the Slot 2 comes to six.

In the embodiment, as described by reference to FIG. 8, the PUCCH of a relay node 400 capable of transmitting a different number of symbols can be multiplexed by means of setting a transmission format of the PUCCH. In an environment where a base station 500 and the relay node 400 are synchronized with each other, an amount of delay becomes greater in sequence of the Case C, the Case B, and the Case A; hence, a distance of the relay node 400 from the base station 500 is long. Therefore, in the embodiment, as the distance of the relay node 400 from the base station 500 becomes greater, the number of symbols used for transmitting the ACK/NACK signal can be increased. The relay node 400 located farther away from the base station 500 is expected to be subjected to poor average line quality. For this reason, as in the first embodiment, the quality of the ACK/NACK signals of the base station 500 having poor line quality can be guaranteed further in this embodiment.

Depending on a cell radius of the base station 500, the relay node 400 existing in the cell of the base station 500 employs only the Case A and the Case B. In this instance, if the number of symbols that can be used in the Slot 1 comes to five for reasons of the Case C, a restriction, though it is not necessary, will be imposed on the number of symbols. Accordingly, the number of transmission symbols in the Case A and the Case B is changed according to the cell radius of the base station 500. When the cell radius is too small to encompass the Case C, six symbols are used in the Slot 1 of the Case A and the Case B, by use of the same format as that used in the Case A and the Case B shown in FIG. 1 of the first embodiment.

In the embodiment, a report as to whether or not the Case C exists is sent from the base station 500 to the relay node 400. In addition, a report as to whether the format shown in FIG. 1 or the format shown in FIG. 8 is used can also be sent from the base station 500 to the relay node 400 in each of the Cases A, B, and C. Further, in the case of the TDD system, a determination can also be made to the cell radius of the base station 500 according to the length of a DwPTS.

Figure 9:
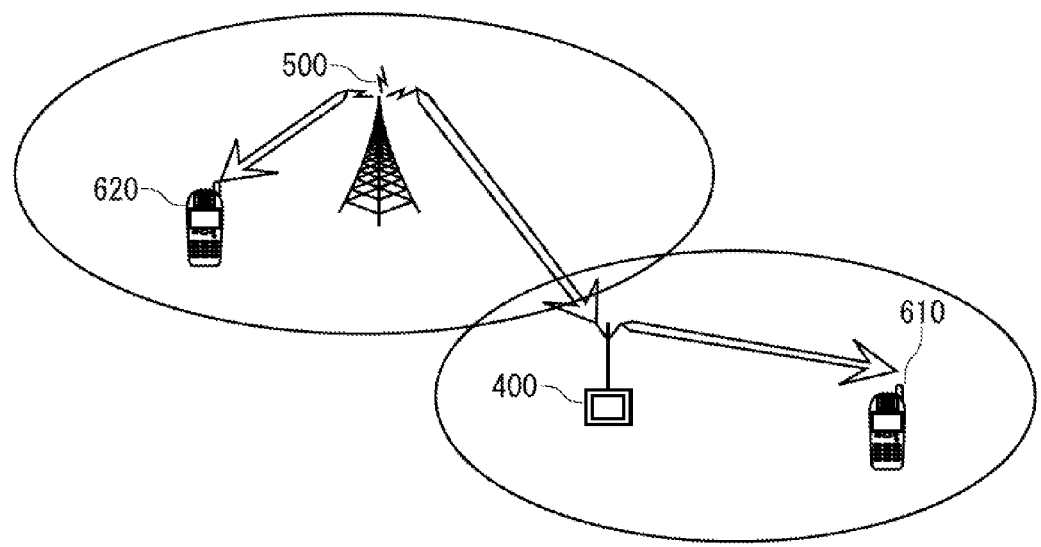
FIG. 9 is a drawing showing a wireless communication system of the second embodiment.

By reference to FIG. 9, a wireless communication system of the embodiment is now described. FIG. 9 is a drawing showing the wireless communication system of the embodiment. As shown in FIG. 9, the relay node 400 receives a downlink (DL) signal from the base station 500 and transmits the thus-received signal to a mobile station 610. The relay node 400 receives an uplink (UL) signal from the mobile station 610 and transmits the signal to the base station 500. A mobile station 620 is a mobile station connected directly to the base station 500.

Figure 10:
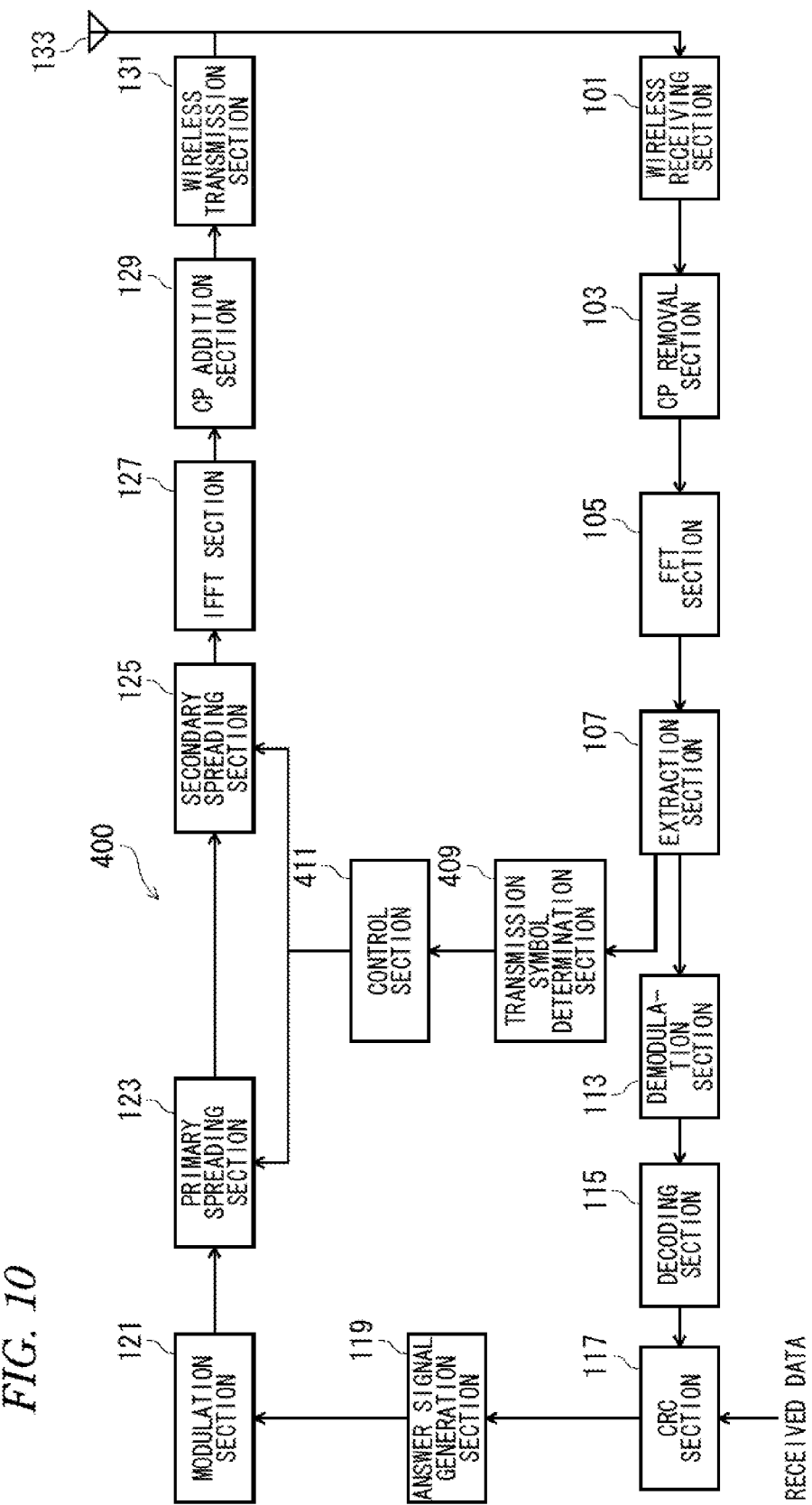
FIG. 10 is a block diagram showing a configuration of a relay node 400.
Figure 11:
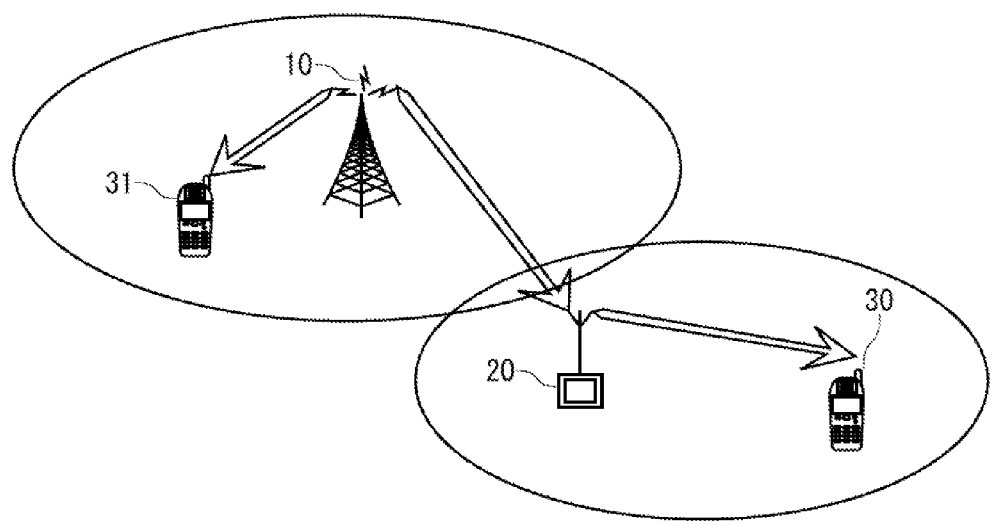
FIG. 11 is a drawing showing a wireless relay system.
Figure 12:
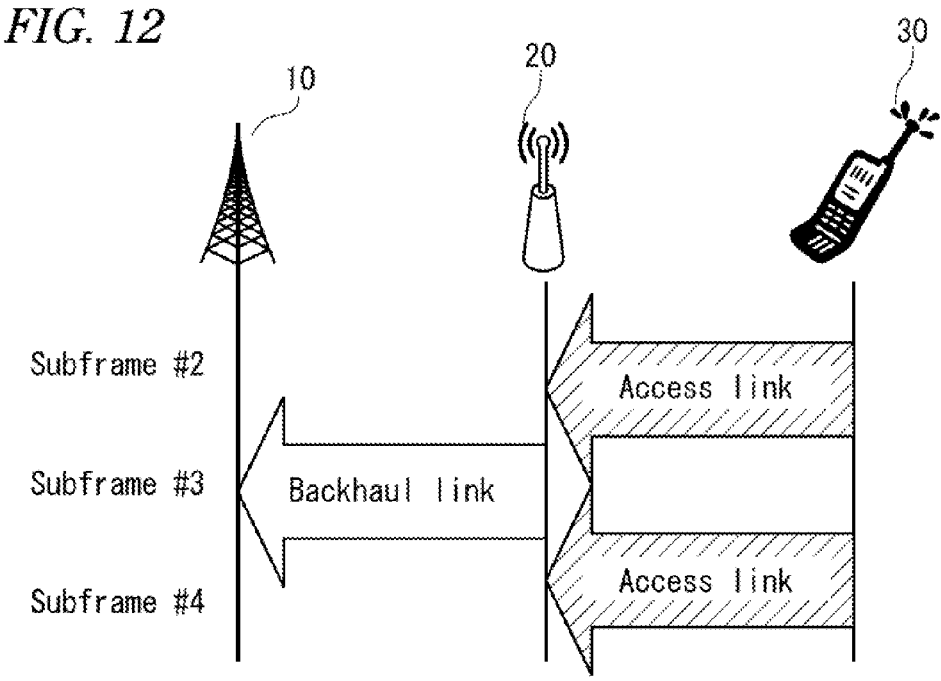
FIG. 12 is a conceptual rendering for explaining an uplink TD relay.
Figure 13:
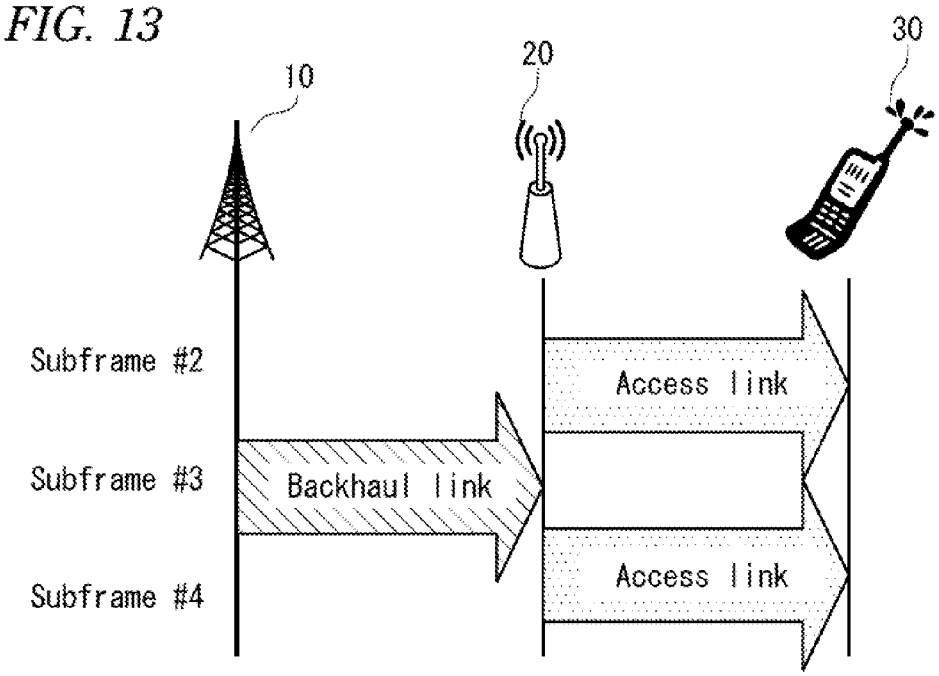
FIG. 13 is a conceptual rendering for explaining a downlink TD relay.
Figure 14:
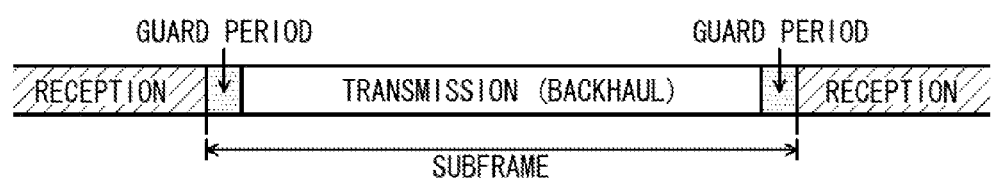
FIG. 14 is a drawing for explaining a guard period.
Figure 15:
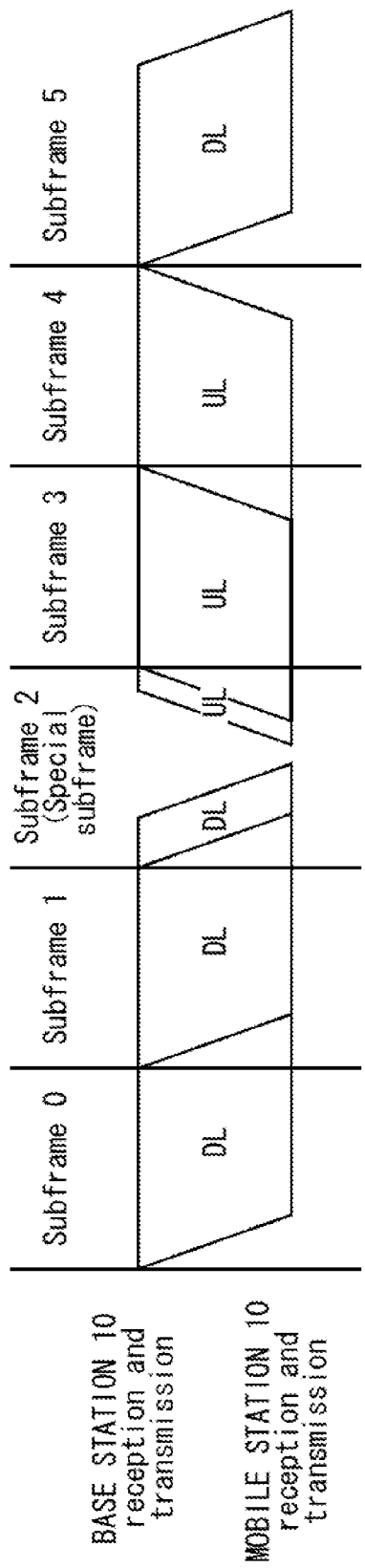
FIG. 15 is a drawing showing an example TDD system.
Figure 16:
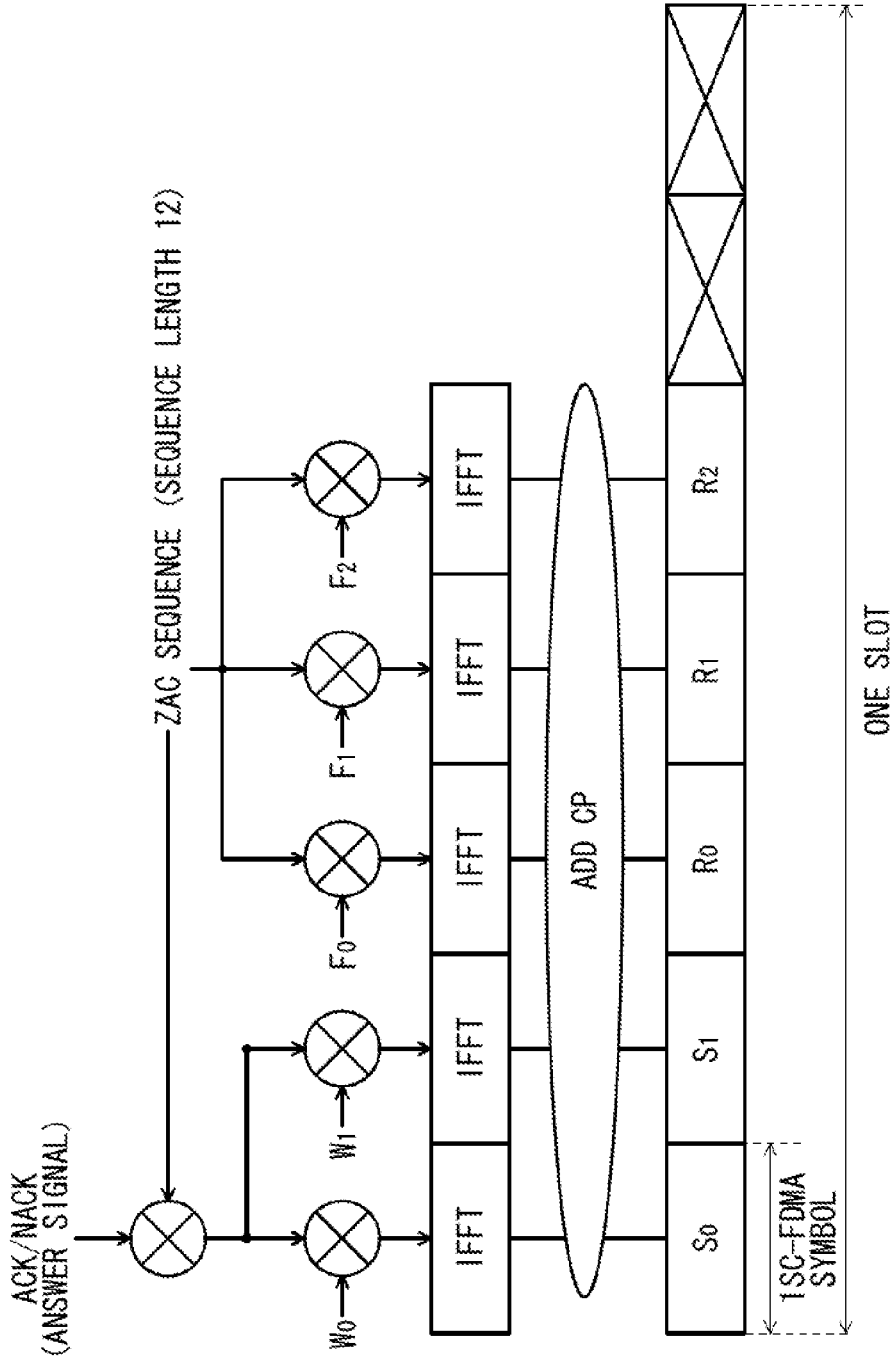
FIG. 16 is a drawing showing an example signal of one slot.
Figure 18:
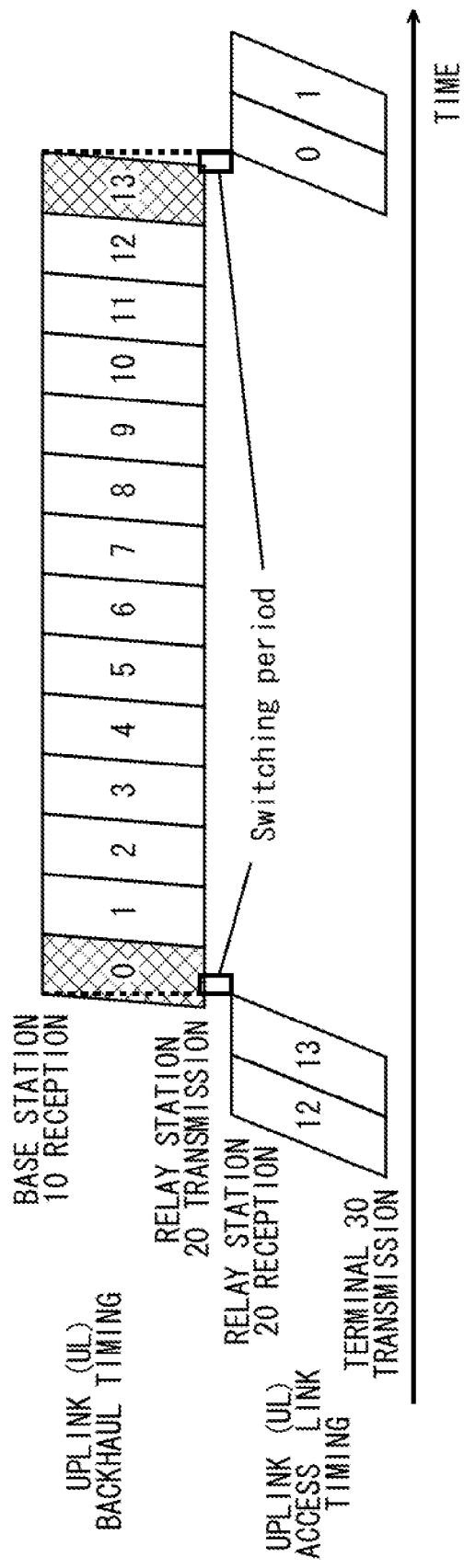
FIG. 18 is a drawing showing example transmission and reception timing (1) in the uplink.
Figure 19:
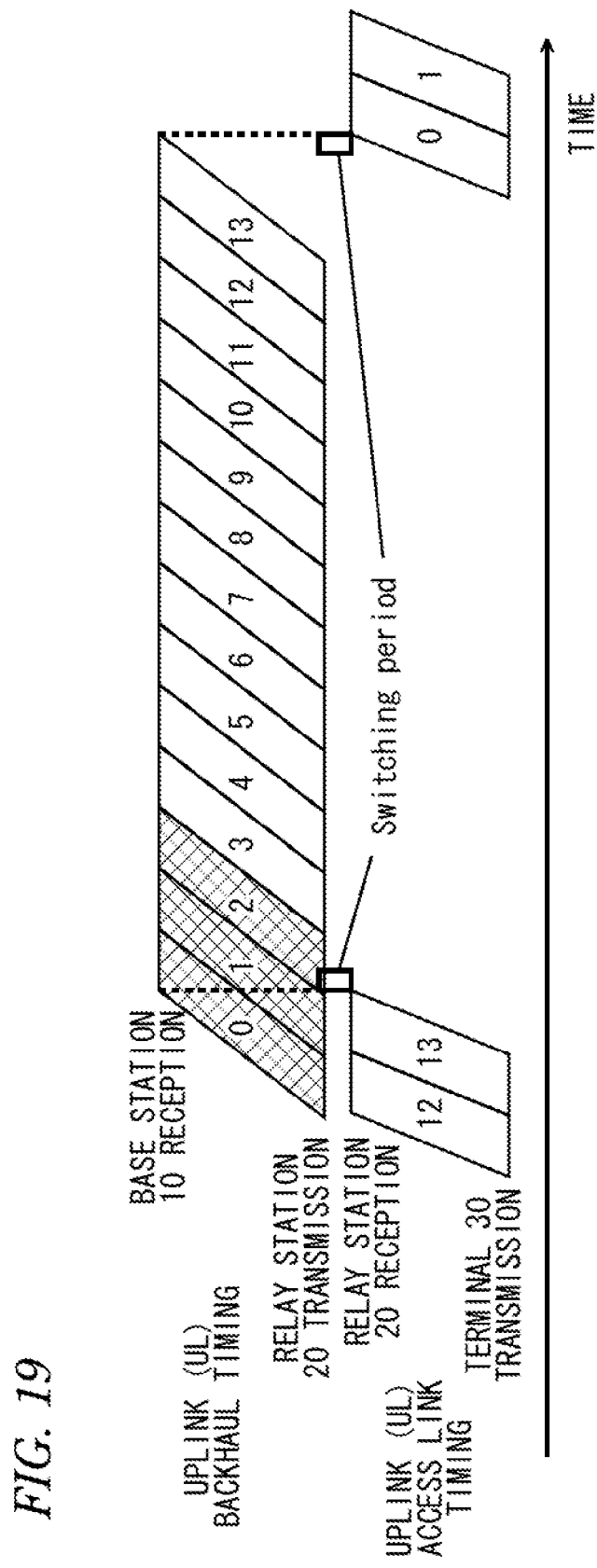
FIG. 19 is a drawing showing example transmission and reception timing (2) in the uplink.

A configuration of the relay node 400 of the embodiment is now described by reference to FIG. 10. FIG. 10 is a block diagram showing the configuration of the relay node 400. In the embodiment, the block diagram is provided in FIG. 10 while attention is paid particularly to a portion by means of which the relay node 400 receives the DL signal from the base station 500 or transmits a PUCCH to the base station 500.

The relay node 400 shown in FIG. 10 is equipped with the wireless receiving section 101, the CP removal section 103, the FFT section 105, the extraction section 107, a transmission symbol determination section 409, a control section 411, the demodulation section 113, the decoding section 115, the CRC section 117, the answer signal generation section 119, the modulation section 121, the primary spreading section 123, the secondary spreading section 125, the IFFT section 127, the CP addition section 129, and the wireless transmission section 131. The relay node 400 shown in FIG. 10 differs from the relay node 100 shown in FIG. 6 in the transmission symbol determination section 409 and the control section 411. In other respects, the relay node is identical with its counterpart relay node 100 in terms of the configuration, and hence its detailed explanation is omitted.

The transmission symbol determination section 409 determines, from timing control information received from the extraction section 107, transmission symbols (i.e., the Case A, B, or C shown in FIG. 8) of the UL signal to be transmitted from the relay node 400 to the base station 500.

The control section 411 determines, from the format (the Case A, B, or C) of the transmission symbols input from the transmission symbol determination section 409, an orthogonal code sequence used as a secondary spreading sequence for the Slot 1 and the Slot 2 and notifies the secondary spreading block of the thus-determined orthogonal code sequence. In the Slot 1, a Walsh sequence of sequence length 2 is directed. In the Case A, the Walsh sequence for A/N symbols in the Slot 2 is given sequence length 2. In the other Cases B, C, and D, the Walsh sequence for the A/N symbols in the Slot 2 is given sequence length 4. Further, a circular shift sequence is determined, and the thus-determined sequence is reported to the primary spreading block. The circular shift sequence can also be determined such that it is determined by a DL assignment signal intended for a relay node or can be previously assigned from station to station. When a plurality of PUCCH signals are transmitted by use of a single resource, a circular shift sequence is set for each of the PUCCH signals.

When the format shown in FIG. 1 is used for each of the Cases A, B, and C or when the format shown in FIG. 8 is switched according to a cell radius, the base station 500 transmits PUCCH format information for relay node, and the extraction section 107 extracts the signal. The thus-extracted signal is output to the transmission symbol determination section 409. The transmission symbol determination section 409 determines whether to use the format shown in FIG. 8 or the format shown in FIG. 1 for the Case A and the Case B and subsequently performs operations.

In the embodiment, as the distance of the relay node 400 from the base station 500 becomes greater, the number of symbols used for transmitting the ACK/NACK signal can be increased. The relay node 400 located farther away from the base station 500 is expected to be subjected to poor average line quality. For this reason, as in the first embodiment, the quality of the ACK/NACK signals of the base station 500 having poor line quality can be guaranteed further in this embodiment.

The relay node described in connection with the embodiments is sometimes expressed as a "relaying station." a "repeater," a "simplified base station, a "cluster head," and so on.

Although the antenna has been described in connection with the embodiments, the invention can also be applied to an antenna port in the same manner. Here, the word "antenna port" designates a logic antenna made up of one or a plurality of physical antennas. Specifically, the antenna port does not necessarily designate one physical antenna but may point out an arrayed antenna made up of a plurality of antennas. For instance, the number of physical antennas making up an antenna port is not specified in the LTE. The antenna port is specified as a minimum unit by means of which the base station can transmit a different reference signal (Reference signal). Further, the antenna port is often specified as a minimum unit that carries out multiplication of a weight on a precoding vector.

Each functional section used to describe the embodiment and each modification is typically implemented by an LSI, which is an integrated circuit. Each functional section may be integrated into one chip, or a portion of or the entire functional section may be integrated into one chip. Here, the LSI is used as the integrated circuit, but the integrated circuit may be called an IC, a system LSI, a super LSI, or an ultra LSI according to the degree of integration.

In addition, a circuit integration method is not limited to LSI, but circuit integration may be implemented by a dedicated circuit or a general-purpose processor. After the LSI circuit is manufactured, a programmable FPGA (Field Programmable Gate Array) or a reconfigurable processor capable of reconfiguring the connection of circuit cells in the LSI circuit or the setting thereof may be used.

When a circuit integration technique capable of replacing LSI appears with the progress of semiconductor technology or other technologies derived from the semiconductor technology, the technique may be used to integrate the functional sections. For example, biotechnology can be applied.

Although the present invention has been described in detail and with reference to specific embodiments, diverse modifications or corrections may be made by those of skilled in the art without departing from the spirit and scope of the present invention.

This application is based on Japanese Patent Application (Japanese Patent Application No. 2010-105840) filed on Apr. 30, 2010, the disclosure of which is incorporated herein by reference in its entirety.

INDUSTRIAL APPLICABILITY

The wireless communication apparatus and the wireless communication method of the invention yield an advantage of the ability to multiplex PUCCH signals of pieces of wireless communication apparatus capable of transmitting different numbers of symbols, and the invention is useful as a wireless communication apparatus, or the like.

REFERENCE SIGNS LIST 100, 400 RELAY NODE
101 WIRELESS RECEIVING SECTION
103 CP REMOVAL SECTION
105 FFT SECTION
107 EXTRACTION SECTION
109, 409 TRANSMISSION SYMBOL DETERMINATION SECTION
111, 411 CONTROL SECTION

113 DEMODULATION SECTION
115 DECODING SECTION
117 CRC SECTION
119 ANSWER SIGNAL GENERATION SECTION
121 MODULATION SECTION
123 PRIMARY SPREADING SECTION
125 SECONDARY SPREADING SECTION
127 IFFT SECTION
129 CP ADDITION SECTION
131 WIRELESS TRANSMISSION SECTION

The invention claimed is:

1. A wireless communication apparatus comprising one or more integrated circuits configured to:
   determine which one of a plurality of formats is used for defining transmission symbols to be transmitted from a relay node to a base station based on timing control or distance information;
   determine a type and a sequence length of an orthogonal code used for assigning ACK/NACK symbols to identical symbols in an identical slot on basis of the format determined by the determination section, without depending on a number of transmission symbols capable of being transmitted to the base station;
   spread the ACK/NACK symbols by an identical type of orthogonal code in the plurality of formats set on the basis of the type and the sequence length of the orthogonal code determined by the control section; and
   transmit the spread ACK/NACK symbols using the determined format.

2. The wireless communication apparatus according to claim 1, further configured to determine, as the identical type of orthogonal code, any one of a DFT sequence of the same sequence length, a Walsh sequence of the same sequence length, and a Walsh sequence of sequence length 2.

3. The wireless communication apparatus according to claim 1, further configured to determine to:
   use a format having transmission symbols which are transmitted to the base station at a first slot in a subframe comprising of the first slot and a second slot, when only a first symbol in an early-half of the first slot cannot be transmitted; and
   use a format having transmission symbols which are transmitted to the base station at only the second slot in the subframe, when a first symbol in the early-half of the first slot and subsequent symbol cannot be transmitted.

4. The wireless communication apparatus according to claim 2, further configured to determine to use a format having the Walsh sequence of sequence length 2 for a first symbol at a second slot in a subframe comprising of a first slot and the second slot and a subsequent symbol, when a final symbol in a last-half of the second slot cannot be transmitted.

5. The wireless communication apparatus according to claim 3, further configured to spread the ACK/NACK symbols in two resource blocks of the second slot by the identical type of orthogonal code when the wireless communication apparatus determines to use the format having transmission symbols to be transmitted to the base station at the second slot in the subframe in a case where the first symbol in the early-half of the first slot and subsequent symbol cannot be transmitted.

6. The wireless communication apparatus according to claim 2, further configured to determine to use a format having the Walsh sequence of sequence length 2 for a final symbol at a first slot in the subframe comprising of the first slot and a second slot and another symbol preceding the final symbol, when a first symbol in an early-half of the first slot cannot be transmitted, or when the first symbol in the early-half first slot and another symbol next to the first symbol cannot be transmitted.

7. A wireless communication method comprising:
   determining which one of a plurality of formats is used for defining transmission symbols to be transmitted from a relay node to a base station based on timing control or distance information;
   determining a type and a sequence length of an orthogonal code used for assigning ACK/NACK symbols to identical symbols in an identical slot on basis of the determined format, without depending on a number of transmission symbols capable of being transmitted to the base station;
   spreading the ACK/NACK symbols by an identical type of orthogonal code in the plurality of formats set on the basis of the determined type and the determined sequence length of the orthogonal code; and
   transmitting the spread ACK/NACK symbols using the determined format.

* * * * *